May 5, 1925. 1,536,788
T. GRADY
MANUALLY PROPELLED VEHICLE
Filed July 5, 1924
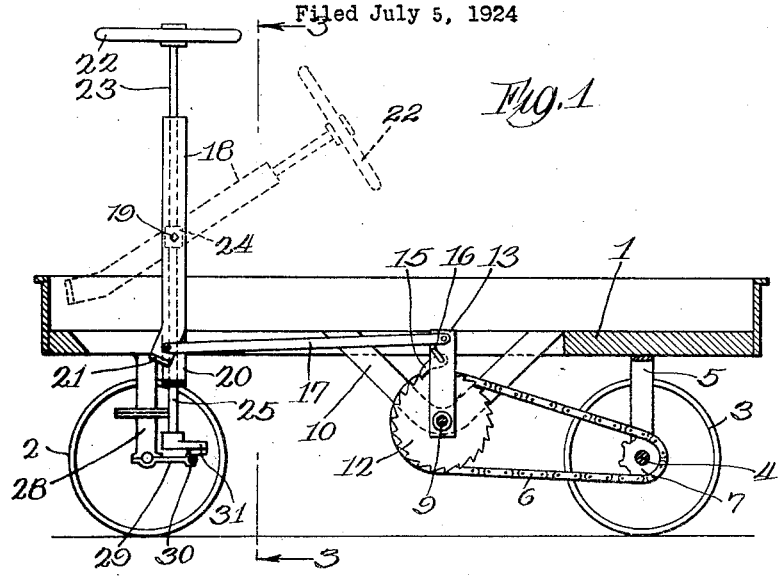
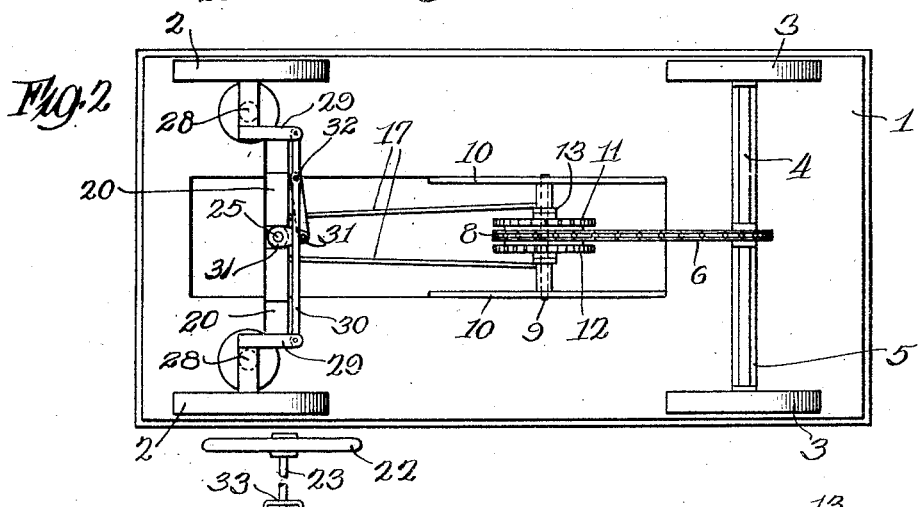
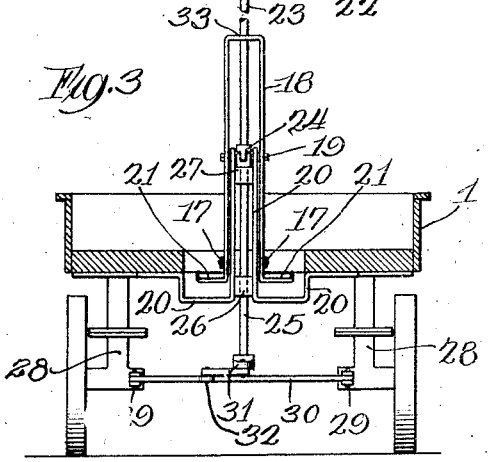
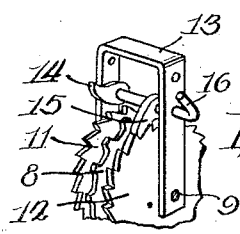
Inventor:
Thomas Grady Patented May 5, 1925.

1,536,788

UNITED STATES PATENT OFFICE.

THOMAS GRADY, OF CHICAGO, ILLINOIS.

MANUALLY-PROPELLED VEHICLE.

Application filed July 5, 1924. Serial No. 724,270.

*To all whom it may concern:*

Be it known that I, THOMAS GRADY, a citizen of the United States, and resident of Chicago, Cook County, Illinois, have invented a certain new and useful Improvement in Manually-Propelled Vehicles, of which the following is a specification.

This invention relates to manually propelled vehicles, and more particularly to those which are for use by children, such as coaster wagons or other similar toy wagons or vehicles.

Generally stated, the object of the invention is to provide a novel and improved construction whereby the vehicle is propelled by back and forth motion of the steering apparatus.

Another object is to provide an improved construction and arrangement whereby the vehicle is propelled by foot power, as well as hand power, through the medium of the steering apparatus, so that the vehicle may be propelled by both the hands and the feet, and steered by hand at the same time.

It is also an object to provide certain details and features of construction and combinations tending to increase the general efficiency and the desirability of a manually propelled vehicle of this particular character.

To the foregoing and other useful ends, the invention consists in the matters hereinafter set forth and claimed, and shown in the accompanying drawings, in which,—

Fig. 1 is a longitudinal section of a manually propelled vehicle embodying the principles of the invention, the same being in the form of a toy wagon, or coaster wagon as they are sometimes called, to illustrate the invention.

Fig. 2 is a bottom plan view of said vehicle.

Fig. 3 is a vertical, transverse section on line 3—3 in Fig. 1.

Fig. 4 is a detail perspective view of a portion of the driving mechanism.

As thus illustrated the invention comprises a wagon body 1 having front wheels 2 and rear wheels 3 therefor, said wheels being of any suitable character. The rear wheels 3 are supported on an axle 4, which is carried by bracket bearings 5 secured to the bottom of the wagon body. Any suitable arrangement may be employed, but, as shown, one rear wheel 3 may be fixed to the axle, while the other rear wheel is loose on said axle. Said axle is driven by a sprocket chain 6 which engages the sprocket wheel 7 on said axle, and which also engages the sprocket wheel 8 on the driving shaft 9, which latter shaft is mounted for rotation in the bracket bearings 10 secured to the bottom of the wagon body. The two ratchet wheels 11 and 12 have their teeth facing in opposite directions, it will be seen, and are both rigid with the sprocket wheel 8, which is disposed between them. A yoke 13 is mounted to rock or oscillate on the shaft 9, and is provided with ratchet dogs 14 and 15, which are fixed on a short rock shaft 16 carried by the yoke. Normally, the dog 15 engages the teeth of the ratchet wheel 12, to propel the vehicle forward when the yoke 13 is rocked back and forth. However, the rock shaft 16 can be given a partial rotation to take the dog 15 out of engagement with the ratchet wheel 12 and to bring the dog 14 into engagement with the ratchet wheel 11, and under these conditions the rocking motion of the yoke 13 will propel the vehicle backward. For rocking or oscillating the yoke 13, rods 17 are connected thereto, and the front ends of these rods are connected to the vertically disposed yoke 18 which is pivoted at 19 on the rigid bracket 20, which latter is formed as shown and rigidly secured to the bottom of the wagon body. The lower ends of the yoke 18 are turned out to provide foot pieces 21, so that the vehicle can be propelled by foot power as well as hand power. The steering wheel 22 is mounted on the upper end of the shaft 23, which extends downward through the yoke 18 and which has a universal joint connection 24 with the upper end of the shaft 25, which latter is mounted to turn in the bearings 26 and 27 which are rigid with the wagon body. The front wheels 2 are mounted to steer the vehicle, and for this purpose have their axles mounted to swing about vertical axes provided by the swivel connections 28, which latter may be of any suitable character. In this way the front wheels can turn to the right or the left, like the wheels of an ordinary automobile, and each steering axle has an arm 29 extending rearward therefrom, and these two arms are connected together by a rod 30, so that the two wheels will turn to the right or left in unison, and will always be parallel with each other. The steering is accomplished by providing the lower end of the shaft 25 with a crank arm 31 which has pivotal connection at 32 with the rod 30 previously mentioned, whereby rotation of the wheel 22 to the right or the left will steer the vehicle to the right or the left. The shaft 23 is free to turn in its upper bearing 33, so that when the yoke 18 is rocked about its pivot 19 the universal joint 24 will function to maintain the steering wheel 22 in operative relation to the steering gear, as indicated in dotted lines in Fig. 1, and in this way the rocking of the yoke 18 by hand and foot power will propel the vehicle. At the same time the hand wheel 22 is also operative to steer the vehicle to the right or the left. The vehicle is propelled forward positively when the steering wheel is pulled backward and when the foot pieces 21 are pushed forward, as at such time the dog 15 functions to drive the vehicle forward. But when the steering wheel is pushed forward, the dog 15 will travel back over the teeth of the sprocket wheel 12, and the vehicle will continue in motion by momentum until the next forward stroke of the yoke 13 on which the ratchet dogs are carried. Of course, when the shaft 16 is adjusted to reverse the motion, the backward propulsion of the vehicle is positively effected when the steering wheel 22 is pushed forward, in a manner that will be readily understood.

Thus it will be seen that a manually propelled vehicle is provided in which a combined steering and propelling mechanism or apparatus is operative to propel the vehicle by both hand power and foot power and to steer the vehicle to the right or the left at the same time. It will be understood, of course, that any desired or suitable seating arrangement can be provided for the vehicle, so that the occupant thereof will be comfortable and will be in position to conveniently propel and steer the vehicle in the desired manner.

Any suitable driving arrangement can be employed, of course, between the hand and foot operated propelling means and the rear wheels, but the ratchet connection and sprocket wheel drive shown and described, which is illustrative of one form of the invention, can be used for this purpose. Any power transmitting mechanism can be employed, in other words, between the hand and foot operated combined steering and propelling means in front, and the driving wheels behind, without departing from the spirit of the invention, for the invention is not limited to the exact construction shown and described, as there are obviously various ways of using the combined steering and hand and foot operated driving mechanism to propel the toy wagon or other vehicle.

As shown and described, the invention is applied to a four-wheeled vehicle, to travel on land, but it is obvious that a combined driving and steering apparatus can be employed in connection with a vehicle or carrier of any suitable character, for steering the same, and for operating the propelling means thereof, without departing from the spirit of the invention, and by vehicle is meant, therefore, anything which can be propelled and steered by means of the apparatus shown and described, which is illustrative of the invention.

What I claim as my invention is:

1. In a manually propelled vehicle, in combination therewith, a manually operated combined propelling and steering apparatus operative by forward and backward rocking motion thereof about a transverse axis through driving means disposed below said axis to propel the vehicle and operative at the same time and while rocking back and forth to steer the vehicle to the right or the left.

2. A structure as specified in claim 1, said apparatus comprising foot pieces movable about said axis and adapted to be engaged by the feet of the occupant of the vehicle, thereby to afford foot power to propel the vehicle.

3. A structure as specified in claim 1, said apparatus comprising foot pieces movable about said axis and adapted to be engaged by the feet of the occupant of the vehicle, thereby to propel the vehicle by foot power, comprising means by which said foot power is augmented by hand power to manually propel the vehicle.

4. A structure as specified in claim 1, said apparatus comprising a steering wheel movable about said axis and provided with a shaft having a universal joint, said shaft being connected to control the steering gear of the vehicle, and comprising also a rocking member for driving the vehicle, said member being movable back and forth by forward and backward movement of the steering wheel about said axis, said universal joint permitting such movement and mode of operation, and said member having connections thereto whereby such back and forth movement of the hand wheel is operative to drive the vehicle.

5. A structure as specified in claim 1, said apparatus comprising a steering wheel provided with a shaft having a universal joint, said shaft being connected to control the steering gear of the vehicle, and comprising also a rocking member for driving the vehicle, said member being movable back and forth by forward and backward movement of the steering wheel, said universal joint permitting such movement and mode of operation, and said member having connections thereto whereby such back and forth movement of the hand wheel is operative to drive the vehicle, and said member having foot pieces at the lower end thereof for engagement with the feet of the occupant of the vehicle, whereby said apparatus is operated by foot power as well as hand power.

6. A structure as specified in claim 1, said apparatus comprising a steering wheel, and means whereby said steering wheel is movable forward and then backward about said axis to propel the vehicle, and said driving means comprising ratchet mechanism operated by said forward and backward movement of the steering wheel.

7. A structure as specified in claim 1, said apparatus comprising a member pivoted to rock about said axis, and a steering wheel and foot pieces movable about said axis and co-operating to rock said member by hand power as well as foot power, said member having connections thereto for driving the vehicle.

8. The improved manually propelled vehicle having means for driving the vehicle by foot power as well as hand power, having a transverse axis about which the hand engaging means above and the foot engaging means below are movable back and forth, substantially as shown and described.

9. In a manually propelled vehicle, the combination of a body, propelling and steering wheels therefor, and a combined propelling and steering apparatus operated by forward and backward motion to propel the vehicle and operative at the same time to steer the vehicle to the right or the left, said apparatus comprising a steering wheel provided with a shaft having a universal joint, said shaft being connected to control the steering gear of the vehicle, and comprising also a rocking member for driving the vehicle, said member being movable back and forth by forward and backward movement of the steering wheel, said universal joint permitting such movement and mode of operation, and said member having connections thereto whereby such back and forth movement of the hand wheel is operative to drive the vehicle, and said member having foot pieces at the lower end thereof for engagement with the feet of the occupant of the vehicle, whereby said apparatus is operated by foot power as well as hand power.

THOMAS GRADY.